Patented Oct. 4, 1949

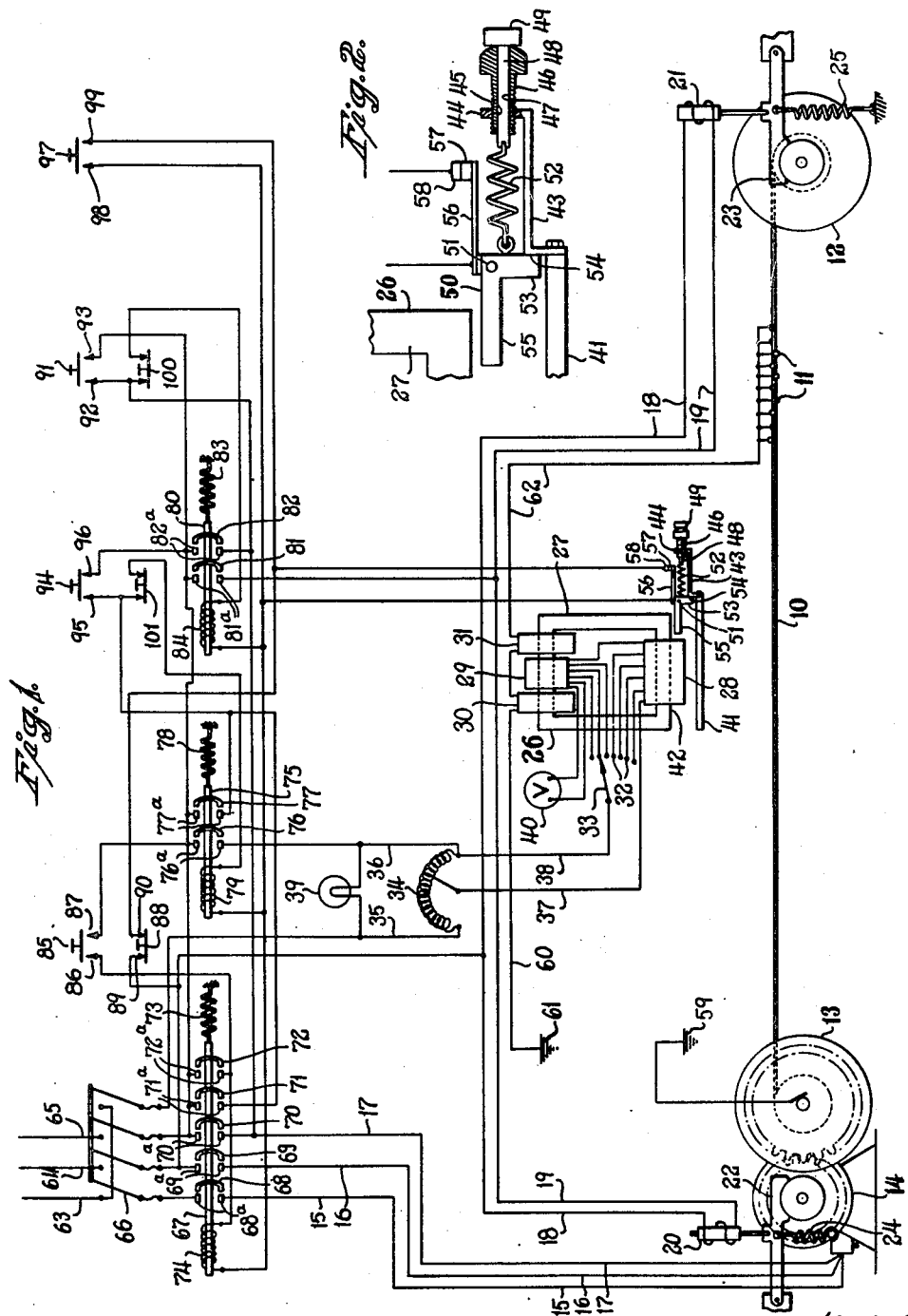

2,483,915

UNITED STATES PATENT OFFICE 2,483,915

INSULATION-TESTING APPARATUS

Harold A. Lines, Hamden, Conn., assignor to The Whitney Blake Company, Hamden, Conn., a corporation of Connecticut Application February 19, 1946, Serial No. 648,775

4 Claims. (Cl. 175—183)

1

This invention relates to improvements in insulation-testing apparatus for testing insulated wire or the like.

In commercial operation, it is desirable to test the insulation of insulated wire or the like while it passes an insulation-testing device at relatively high speed, on its way, for example, to be wound up on a take-up reel, and when the electrical means employed for the testing, discovers a hole or defect in the insulation, it sets in operation mechanism to stop the reeling-up operation as quickly as possible. But nevertheless, with the insulation-testing apparatus employed heretofore for this purpose, too long a time has elapsed between the time that a spark from the testing means locates a defect in the insulation, and sets in operation the mechanism which stops the reeling-up operation, thus slowing up and hindering the actual locating and repairing of the defect in the insulation.

One object of this invention, therefore, is to provide an improved insulation-testing apparatus which will more quickly stop the reeling-up operation, once the electric spark has located a defect in the insulation.

With the above and other objects in view, as will appear to those skilled in the art from the present disclosure, this invention includes all features in the said disclosure which are novel over the prior art.

In the description and claims, the various parts and steps are identified by specific terms for convenience, but they are intended to be as generic in their application as the prior art will permit.

In the accompanying drawings forming part of the present disclosure, in which one way of carrying out the invention is shown for illustrative purposes:

Fig. 1 is a schematic view illustrating one way of carrying out the present invention; and Fig. 2 is an enlarged view of the switch and switch-actuating means shown in Fig. 1.

Most of the apparatus illustrated in Fig. 2 is new and part of this invention. It is old and well known to electrically test the insulation on electrically-insulated wire or cable or the like 10 while it is traveling past, close to or in contact with a testing electrode 11 as, for example, while the insulated wire or the like 10 is being reeled from a pay-off reel 12 onto a take-up reel 13 driven by an electric-motor 14 by means of electric power fed to the motor, as, for example, through the wires 15, 16 and 17. The electrical-circuits are such that when the electric-motor

2

14 is driving the take-up reel 13, electric power through wires 18 and 19 causes the solenoids 20 and 21 to respectively lift the brake-shoes 22 and 23 to off or non-braking position against the action of the springs 24 and 25. And when electric power through the wires 15, 16 and 17 is interrupted or shut off from the motor 14, electric power through the wires 18 and 19 to the solenoids 20 and 21 is also shut off to thus permit the springs 24 and 25 to promptly move the brake-shoes 22 and 23 to on or braking position as illustrated in Fig. 1, to thus quickly stop the travel of the insulated wire 10 being tested.

A main transformer 26 is provided for transforming an alternating current from about two hundred and thirty volts up to about fifteen thousand volts, for example, which latter voltage is applied to a testing electrode 11 to be employed for testing the insulation of wires and cables as will be more fully hereinafter described. The transformer 26 has a core 27 of magnetic material such for example as iron, primary wire-coils or winding 28 and 29, and secondary wire-coils or winding 30 and 31. The primary winding consisting of the primary coils 28 and 29, is arranged with a plurality of contacts 32 for adjustable engagement by a pivoted contact-arm 33 to vary the number of effective turns of the primary winding, and thereby to vary the consequent voltage produced in the secondary circuit. A variable transformer 34 well known as an autotransformer, is provided to permit of obtaining finer adjustment between the adjustments obtained by the contacts 32 and contact-arm 33. Alternating current at about two hundred and thirty volts is led to the autotransformer 34 by the wires 35 and 36. Wires 37 and 38 connect the autotransformer 34 to the main transformer 26. A pilot light 39 is connected across wires 35 and 36 to show when current is on in the primary of the transformer 26, and in consequence is on in the secondary of the transformer 26 for testing purposes. A voltmeter 40 can be calibrated to indicate what voltage is on at the testing electrode 11, as a result of the adjustments to the primary of the transformer 26 and the autotransformer 34.

A magnetic-flux conductor-plate or bar 41 of iron or other magnetic material, extends along, spaced from and beneath and generally parallel to, the lower reach 42 of the magnetic-core 27 of the transformer 26. Secured to the right end of the plate 41, is a bracket 43 having an upstanding-arm 44 provided with a threaded-aperture 45 in which a screw 46 is threadedlyengaged. The screw 46 has a cylindrical hole 47 longitudinally therethrough, through which extends the cylindrical shank 48 of a headed pin 49, the shank 48 being freely slidable and rotatable in the hole 47. An L-shape magnetic-flux conductor-member 50 is pivoted at 51 to supporting-structure (not shown) so as to have a limited pivoted or swinging movement about the pivot 51. A spring 52 interconnects the downwardly-extending arm 53 of the member 50 and the end of the shank 48 of the pin 49 to thus hold the arm 53 engaged against the abutment portion 54 of the bracket 43, and with the horizontal-arm 55 of the member 50 spaced from the magnetic-core 27 of the transformer 26. A switch-arm 56 is secured to the member 50 and has, as its outer end, a switch-contact 57 normally held in engagement with a switch-contact 58 by the action of the spring 52.

The wire or cable 10 being tested, has its end which is on the take-up reel 13, electrically connected to ground 59 in a way well known to those skilled in the art, and one end of the secondary circuit of the transformer 26 is connected by wire 60 to ground 61 while the other end of the secondary circuit is connected by the wire 62 to the testing-electrode 11, of any suitable form well known to those skilled in the art, as for example, a considerable quantity of metallic bead-chain which lies in a trough and surrounds the insulated wire 10 so as to have many metal contacts in engagement with substantially the entire outer surface of the insulation, at least at every point as it passes longitudinally through the bead-chain.

Three-phase, two hundred and thirty volt electric current may be brought in by wires 63, 64 and 65 to a switch 66. A longitudinally-slidable switch-bar or rod 67 has secured thereon, switch-arms 68, 69, 70, 71 and 72, the switch-bar 67 normally being held pulled to the right in open-switch position by means of a spring 73, and being operable against the action of the spring 73, by means of a solenoid 74, as will hereinafter be more fully described, to cause the switch-arms 68, 69, 70, 71 and 72, to respectively bridge the corresponding pairs of contacts 68a, 69a, 70a, 71a and 72a to thus close these switches.

A second longitudinally-slidable switch-bar 75 has switch-arms 76 and 77 secured thereon and respectively adapted to engage pairs of switch-contacts 76a and 77a. The switch-bar 75 is normally held pulled to the right in open-switch position by means of a spring 78, and is slidable to the left to closed-switch position against the action of the spring 78 by means of a solenoid 79.

A third longitudinally-slidable switch-bar 80 has secured thereon, switch-arms 81 and 82 respectively adapted to engage corresponding pairs of switch-contacts 81a and 82a. The switch-bar 80 is normally held pulled to the right in open-switch position by a spring 83, and is slidable to the left to closed-switch position against the action of the spring 83 by means of a solenoid 84.

The transformer 26 is designed to have a high-magnetic-flux-leakage, and is sometimes called a high-reactance transformer, and is well known in the art. When there is substantially no current flowing in the secondary circuit of the transformer, there is little or no leakage of magnetic-flux out into the air from the magnetic-core 27 of the transformer, but upon an increase of current in the secondary circuit, there is a marked increase in the leakage of magnetic-flux from the core 27 out into the surrounding air and along paths well known to those skilled in the art. The L-shape magnetic operating member 50 is ordinarily held in the position shown in Figs. 1 and 2 by means of adjustment of the spring 52 to the necessary tension which will readily be found by trial. If now, during the testing of the insulated wire 10 as it travels past the testing-electrode 11, there should be a hole in the insulation, a spark will leap from electrode 11 through the defect or hole in the insulation to the central metal wire of the insulated wire 10 and be conducted to the ground to thus complete the secondary circuit in the manner hereinbefore described. This rush of current in the secondary instantly causes a large increase in the leakage of magnetic flux from the magnetic-core 27, including leaking from the lower reach 42 of the magnetic-core 27 across to and through the arms 55 and 53 of the L-shape magnetic member 50 to and along through the magnetic-conductor-plate 41 and then across through the air back to the reach 42 of the magnetic-core 27 beyond the left end of the coil 28. This leakage or passage of the magnetic flux along the path described instantly causes the L-shape member 50 to be swung upwardly about its pivot 51, thus swinging the switch-arm 56 downwardly and breaking the electrical contact between the contacts 57 and 58 in the primary electrical-circuit to thus stop all of the mechanism in a manner that will hereinafter be more fully described.

This utilization of the increase of magnetic-flux leakage to cause the breaking of the circuit, permits of stopping the travel of the insulated wire 10 more quickly than has been possible by constructions employing a circuit-breaking device placed directly in the primary or secondary circuit of the transformer. It is very important to stop the travel of the wire just as quickly as possible upon the testing-electrode 11 having located a defect in the insulation, inasmuch as it is necessary in practice to run the wire back after it has been stopped, to find the defective spot, and to then repair it.

Assuming that the apparatus illustrated in the drawings has the parts in the positions illustrated, which is the position when the apparatus is still and without any current on, and with the wire 10 stationary and not traveling, let it be assumed that it is now desired to start testing the insulated wire 10. If now the starter button 85 is pressed down against the action of its spring (not shown) to close the circuit across the contacts 86 and 87, current will flow through the solenoid 74. When the solenoid 74 pulls the switch-bar 67 to the left against the action of the spring 73, the switch-arms 68, 69, 70, 71 and 72 carried by the switch-bar 67 will respectively close the circuit across their respective pairs of contacts and current will flow through the solenoids 79 and 84. Similarly, the second solenoid 79 causes the switch-arms 76 and 77 to respectively close across their pairs of contacts, and the third solenoid 84 causes the switch-arms 81 and 82 to respectively close across their pairs of contacts. Although the starter button 85 may be quickly returned by its spring (not shown) to open-circuit position on being released by the operator, the circuits through all three solenoids will be held closed as a result of lock-in switch-arm 72 being closed across its pair of contacts 72a. Current passing across the switch-arms 68, 69 and 70 passes through the wires 15, 16 and 17 to thus run the motor 14. Current passing across the switch-arm 81 on the third switch-bar 80 and through the wires 18 and 19 to the solenoids 20 and 21 releases the brake-shoes 22 and 23, thus permitting the motor 14 to rotate the take-up reel 13 and thus cause the insulated wire 10 to travel past the testing-electrode 11. Current passing across the switch-arm 76 and through the wires 35 and 36 to the transformer 26, activates the testing electrode 11 in the secondary circuit of the transformer.

Thus the pressing down of the starter button 85 has set in motion and properly activated all of the apparatus so that the insulated wire is now traveling to the left and being wound on the take-up reel 13 while it passes with its insulation covering in close engagement at many points over a long length with the testing-electrode 11, which has a high-voltage impressed thereon.

If now while all of the parts are in operation with high-tension current on the testing electrode 11, a perforation or equivalent defect in the insulation of the insulated wire 10 comes against any part of the electrode 11 during the reeling-up operation, a high-tension current will jump through the opening of the defect of the insulation, thus causing a current to flow in a secondary circuit of the transformer 26, and thus causing a marked increase of leakage of magnetic flux out from the magnetic-core 27 of the transformer 26 and across through the L-shaped magnetic member 50 to cause the latter to swing upwardly and thus open the switch-contacts 57 and 58 in a manner hereinbefore more fully described, thus breaking the circuit to all of the solenoids 74, 79 and 84, and permitting the springs 73, 78 and 83 to slide the three switch-bars 67, 75 and 80 longitudinally to the right to thus open all of the switches actuated by these three switch-bars and thus shut off current to all parts of the apparatus. Thus the electric current to the motor 14 ceases, and electric current to the solenoids 20 and 21 ceases thus permitting the springs 24 and 25 to pull the brake-shoes 22 and 23 down into braking-position to thus promptly stop the travel of the insulated wire 10, and also shuts off current to the transformer thus rendering the testing-electrode 11 dead.

If, for any reason, it was desired to shut off the entire apparatus without waiting for the spark from the testing-electrode to locate a defective portion of the insulation, this could be accomplished by pressing down upon the stop button 88 to thus break the circuit through the contacts 89 and 90.

Assuming now that while the apparatus was running, a spark from the testing-electrode 11 has detected a defective spot in the insulation of the traveling insulated wire 10, and has brought the entire mechanism to a stop as hereinbefore described, the operator will ordinarily now press down on the push button 91 against the action of its spring (not shown) to close the circuit across the contacts 92 and 93 to thus activate the solenoid 84 to cause it to slide the switch-bar 80 to the left to close the switch-arm 81, against its contacts 81a to lift or release the brake-shoes 22 and 23, and to cause the switch-arm 82 to engage its contact 82a to lock the circuit in closed-circuit condition that will not be broken when the spring raises the push button 91 back to its original position. Also, the operator will press the push button 94 down against the action of its spring (not shown) to close the circuit across the contacts 95 and 96 to activate the solenoid 79 and thus slide the switch-bar 75 to the left to cause the switch-arm 76 to close across its contacts 76a to thus supply current to the transformer 26 to activate the testing-electrode 11 with high-tension current. Now the operator, either by hand or otherwise, will slowly cause the pay-off reel 12 to be rotated clockwise to draw the insulated wire 10 back slowly toward the right until the defective spot in the insulation is located by a spark from the testing-electrode 11 which results in opening the switch-contacts 57 and 58 as hereinbefore described, thus immediately putting on the brakes and shutting off the current to the testing-electrode. The operator can now press down push button 91 solely to release the brakes thereby freeing the insulated wire for movement by the operator if found desirable either to the right or the left to a position away from the testing-electrode 11 if necessary to give good visibility. If the operator now sees the hole or other defect in the insulation, he proceeds to repair it in a way well known to those skilled in the art. And if the hole or other defect is so small as not to be visible to the operator, in addition to leaving the brakes released in the condition in which they now exist, he can again press down on the push button 94 to again activate the testing-electrode 11, and can slowly move the insulated wire until high-tension current leaks from the electrode 11 to the defective hole in the insulation which thereupon shuts off all the mechanism. Now in order to render the defective hole larger and more readily visible, the operator can press down on the push button 97, against the action of its spring (not shown) to close the circuit across the contacts 98 and 99 and press down push button 94 to again activate testing-electrode 11 to thus cause high-tension current to flow from the electrode 11 through the defective hole in the insulation of the insulated wire, and by holding the push button 97 down a sufficient length of time, this action of the electric current can be made to continue long enough to burn a larger more readily visible hole at the defective place in the insulation, the purpose of this push button 97 being to permit of keeping the high-tension current on the testing-electrode to thus burn a larger hole, without permitting the current to the transformer 26 to be shut off by the opening of the switch-contacts 57 and 58 as would normally occur if the push button 97 were not being held down. A push button 100 permits of putting on the brakes if they had been released by the push button 91, and an off push button 101 permits of shutting off current to the transformer if it had been put on by the operation of the push button 94.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An insulation-testing apparatus including: a testing electrode; a drive-means constructed and arranged to cause an insulated wire which is to be tested to travel past said testing electrode with the outer surface of the insulation of the wire close enough to said electrode to result in a flow of current between said electrode and the wire through a defect in the insulation of the wire; a high-reactance transformer characterized by a core of magnetic material, a relatively-high-voltage secondary winding on said core having one terminal connected to said testing electrode and the other terminal connected to a wire to be tested, a relatively-low-voltage primary winding on said core adjacent said secondary winding, and a second relatively-low-voltage primary winding on said core, said second primary winding being remote from said secondary winding whereby the magnetic flux from said second primary winding is permitted to leak across the portion of the core interposed between the secondary winding and the second primary winding without passing through the secondary winding, the flux generated by the secondary winding due to an increase of current in the secondary circuit resulting from a flow of current through a defect in the insulation of a wire being tested, opposing the flux generated by the adjacent primary winding thereby to effect an increase in magnetic flux leakage from the core; shut-off-means constructed and arranged to be actuated to cause the stoppage of said drive-means and thus cause the stoppage of travel of the insulated wire being tested; and shutoff-actuating means including means having no connection in the secondary circuit of said transformer and arranged adjacent the magnetic core thereof so as to be responsive to said increase of magnetic flux leakage, said shut-off actuating-means being constructed and arranged to be actuated by said increase of magnetic flux leakage to cause said shut-off-actuating means to actuate said shutoff-means to cause the stoppage of said drive-means when there is a said flow of current through a defect in the insulation of a wire being tested.

2. An insulation-testing apparatus including: a testing electrode; drive-means constructed and arranged to cause an insulated wire which is to be tested to travel past said testing electrode with the outer surface of the insulation of the wire close enough to said electrode to result in a flow of current between said electrode and the wire through a defect in the insulation of the wire; a high-reactance transformer characterized by a core of magnetic material, a relatively-high-voltage secondary winding on said core having one terminal connected to said testing electrode and the other terminal connected to a wire to be tested, a relatively-low-voltage primary winding on said core adjacent said secondary winding, and a second relatively-low-voltage primary winding on said core, said second primary winding being remote from said secondary winding whereby the magnetic flux from said second primary winding is permitted to leak across the portion of the core interposed between the secondary winding and the second primary winding without passing through the secondary winding, the flux generated by the secondary winding due to an increase of current in the secondary circuit resulting from a flow of current through a defect in the insulation of a wire being tested, opposing the flux generated by the adjacent primary winding thereby to effect an increase in magnetic flux leakage from the core; shutoff-means constructed and arranged to be actuated to cause the stoppage of said drive-means and thus cause the stoppage of travel of the insulated wire being tested; and shutoff-actuating means having no connection in the secondary circuit of said transformer and including a movable-member of magnetic material arranged adjacent the magnetic core thereof so as to be responsive to said increase of magnetic flux leakage, said movable magnetic member being constructed and arranged to be actuated by said increase of magnetitc flux leakage to cause said shutoff-actuating means to actuate said shutoff-means to cause the stoppage of said drive-means when there is a said flow of current through a defect in the insulation of a wire being tested.

3. An insulation-testing apparatus including: a testing electrode; drive-means constructed and arranged to cause an insulated wire which is to be tested to travel past said testing electrode with the outer surface of the insulation of the wire close enough to said electrode to result in a flow of current between said electrode and the wire through a defect in the insulation of the wire; a high-reactance transformer characterized by a core of magnetic material, a relatively-high-voltage secondary winding on said core having one terminal connected to said testing electrode and the other terminal connected to a wire to be tested, a relatively-low-voltage primary winding on said core adjacent said secondary winding, and a second relatively-low-voltage primary winding on said core, said second primary winding being remote from said secondary winding whereby the magnetic flux from said second primary winding is permitted to leak across the portion of the core interposed between the secondary winding and the second primary winding without passing through the secondary winding, the flux generated by the secondary winding due to an increase of current in the secondary circuit resulting from a flow of current through a defect in the insulation of a wire being tested, opposing the flux generated by the adjacent primary winding thereby to effect an increase in magnetic flux leakage from the core; shutoff-means constructed and arranged to be actuated to cause the stoppage of said drive-means and thus cause the stoppage of travel of the insulated wire being tested; a magnetic flux conductor extending along a substantial length of a path of leakage of said magnetic flux; and shutoff-actuating means having no connection in the secondary circuit of said transformer and including movable magnetic means between said magnetic core and said magnetic flux conductor responsive to said increase of magnetic flux leakage, said movable magnetic means being constructed and arranged to be actuated by said increase of magnetic flux leakage to cause said shutoff-actuating means to actuate said shutoff-means to cause the stoppage of said drive-means when there is a said flow of current through a defect in the insulation of a wire being tested.

4. An insulation-testing apparatus including: a testing electrode; drive-means constructed and arranged to cause an insulated wire which is to be tested to travel past said testing electrode with the outer surface of the insulation of the wire close enough to said electrode to result in a flow of current between said electrode and the wire through a defect in the insulation of the wire; a high-reactance transformer characterized by a core of magnetic material, a relatively-high-voltage secondary winding on said core having one terminal connected to said testing electrode and the other terminal connected to a wire to be tested, a relatively-low-voltage primary winding on said core adjacent said secondary winding, and a second relatively-low-voltage primary winding on said core, said second primary winding being remote from said secondary winding whereby the magnetic flux from said second primary winding is permitted to leak across the portion of the core interposed between the secondary winding and the second primary winding without passing through the secondary winding, the flux generated by the secondary winding due to an increase of current in the secondary circuit resulting from a flow of current through a defect in the insulation of a wire being tested, opposing the flux generated by the adjacent primary winding thereby to effect an increase in magnetic flux leakage from the core; shutoff-means constructed and arranged to be actuated to cause the stoppage of said drive-means and thus cause the stoppage of travel of the insulated wire being tested; a magnetic flux conductor extending along a substantial length of a path of leakage of said magnetic flux; and shutoff-actuating means having no connection in the secondary circuit of said transformer and including a movable-member of magnetic material between said magnetic core and said magnetic flux conductor responsive to said increase of magnetic flux leakage, said movable magnetic member being constructed and arranged to be actuated by said increase of magnetic flux leakage to cause said shutoff-actuating means to actuate said shutoff-means to cause the stoppage of said drive-means when there is a said flow of current through a defect in the insulation of a wire being tested.

HAROLD A. LINES.

REFERENCES CITED

The following references are of record in the file of this patent:

UNITED STATES PATENTS

| Number | Name | Date |
| --- | --- | --- |
| 960,440 | Thomson | June 7, 1910 |
| 1,612,363 | Dorman | Dec. 28, 1926 |
| 1,940,496 | James | Dec. 19, 1933 |
| 2,043,528 | Davis | June 9, 1936 |
| 2,087,783 | Savage | July 20, 1937 |
| 2,099,112 | Hill | Nov. 16, 1937 |
| 2,125,630 | Gooding | Aug. 2, 1938 |
| 2,149,634 | Schweitzer | Mar. 7, 1939 |
| 2,305,380 | Edwards | Dec. 15, 1942 |
| 2,306,529 | Davis | Dec. 29, 1942 |
| 2,310,149 | McDermott | Feb. 2, 1943 |